US009240986B1

(12) United States Patent
Ackerman et al.

(10) Patent No.: US 9,240,986 B1
(45) Date of Patent: Jan. 19, 2016

(54) MANAGING SECURITY AND WIRELESS SIGNAL DETECTION (71) Applicants: Karl Ackerman, Topsfield, MA (US); William W. Duane, Westford, MA (US); Yedidya Dotan, Newton, MA (US)

(72) Inventors: Karl Ackerman, Topsfield, MA (US); William W. Duane, Westford, MA (US); Yedidya Dotan, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 204 days.

(21) Appl. No.: 13/628,746

(22) Filed: Sep. 27, 2012

(51) Int. Cl.
G06F 17/30 (2006.01)
H04L 29/06 (2006.01)
G06F 21/34 (2013.01)

(52) U.S. Cl.
CPC ............... *H04L 63/08* (2013.01); *G06F 21/34* (2013.01)

(58) Field of Classification Search
CPC ...... H04L 9/003; H04L 9/3234; H04L 9/3228
USPC ...................................... 726/2, 6, 9
See application file for complete search history.

(56) References Cited

U.S. PATENT DOCUMENTS

2006/0136997 A1* 6/2006 Telek et al. ............ 726/5
2009/0222669 A1* 9/2009 Huang et al. .......... 713/182
2013/0340071 A1* 12/2013 Vellozo Luz et al. ..... 726/18

* cited by examiner

*Primary Examiner* — Baotran N To
(74) *Attorney, Agent, or Firm* — Krishnendu Gupta; Jason A. Reyes (57) ABSTRACT A method is used in managing security and wireless signal detection. Information is gathered about analog signal reception at a receiver. Based on the information, a result is produced for use in determining location information at the receiver. The result is used to affect a security decision.

20 Claims, 3 Drawing Sheets

MANAGING SECURITY AND WIRELESS SIGNAL DETECTION

RELATED APPLICATIONS

This application is related to co-pending U.S. patent application Ser. No. 12/827,045 entitled "DEVICE BOUND OTP GENERATION", filed Jun. 30, 2010, and Ser. No. 12/895,130 entitled "AGILE OTP GENERATION", filed Sep. 30, 2010, and U.S. Pat. No. 8,060,750 entitled "SECURE SEED PROVISIONING", and U.S. Pat. No. 7,502,933 entitled "IDENTITY AUTHENTICATION SYSTEM AND METHOD", the contents of which applications and patents are hereby incorporated herein by reference in their entirety.

BACKGROUND OF THE INVENTION

Computer networks, and in particular Wide Area Networks (WANs) such as the Internet, provide opportunities for the misuse and abuse of communications traveling thereover. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

In many secure communication applications, a seed is required in order to perform certain cryptographic operations such as encryption, decryption, authentication, etc. The seed may comprise, by way of example, a symmetric key or other secret shared by two or more entities.

One such application is in authentication tokens, such as the RSA SecurID® authentication token commercially available from RSA, The Security Division of EMC, of Bedford, Mass., U.S.A. The RSA SecurID® authentication token is used to provide two-factor authentication. As used herein token generator and OTP generator may be used interchangeably. Authorized users are issued individually-registered tokens that generate one time passcodes (OTPs), which change based upon any of a variety of algorithms including, but not limited to, a time code algorithm. (Other algorithms include counter-based and challenge-response.) OTPs may be used for various forms of authentication such as user, machine, transaction and message authentication. For example, a different OTP may be generated every 60 seconds. In a given two-factor authentication session, the user is required to enter a personal identification number (PIN) plus the current OTP from his or her authentication token. This information is supplied to an OTP validation entity. The OTP validation entity may be a server or other processing device equipped with RSA Authentication Manager® software, available from RSA, The Security Division of EMC. The PIN and current OTP may be transmitted to the OTP validation entity via an encryption agent equipped with RSA Authentication Agent® software, also available from RSA, The Security Division of EMC. If the PIN and current OTP are determined to be valid, the user is granted access appropriate to his or her authorization level. Thus, the OTPs are like temporary passwords that cannot be guessed by an attacker, with other than a negligible probability.

A given RSA SecurID® token typically contains one or more seeds that are utilized in computing the token outputs. The OTP validation entity performing the verification of the token outputs requires access to one or more seeds associated with the token in question. Typically, such authentication entities have access to the same seed or set of seeds that the token uses to generate its output.

Market adoption of wireless technology has exploded, as users from a wide range of backgrounds and vertical industries have brought this technology into their homes, offices, and increasingly into the public air space.

The rapid proliferation of lightweight, portable devices has enabled users to remain connected to various wireless sources, while roaming throughout a building or other physical location. The mobility afforded by wireless sources has generated a lot of interest in applications and services that are a function of a mobile user's physical location. Examples of such applications include: locating a mobile user and displaying a map of the immediate surroundings.

The use of radio signals to estimate the location of a wireless device or node is known. For example, a Global Positioning System (GPS) receiver obtains location information by triangulating its position relative to four satellites that transmit radio signals. The GPS receiver estimates the distance between each satellite based on the time it takes for the radio signals to travel from the satellite to the receiver (i.e., Time Difference Of Arrival (TDOA) calculations). Signal propagation time is assessed by determining the time shift required to synchronize the pseudo-random signal transmitted by the satellite and the signal received at the GPS receiver. Although triangulation only requires distance measurements from three points, at least one additional distance measurement from at least one additional satellite is used for error correction.

The distance between a wireless transmitter and a receiver can also be estimated based on the strength of the received signal, or more accurately the observed attenuation of the radio signal. Signal attenuation refers to the weakening of a signal over its path of travel due to various factors like terrain, obstructions and environmental conditions. Generally speaking, the magnitude or power of a radio signal weakens as it travels from its source. The attenuation undergone by an electromagnetic wave in transit between a transmitter and a receiver is referred to as path loss. Path loss may be due to many effects such as free-space loss, refraction, reflection, and absorption.

In some environments, location-tracking systems may be based on RF triangulation or RF fingerprinting techniques, or on cell tower triangulation. RF triangulation calculates a mobile station's location based upon the detected signal strength of nearby access points (APs). It assumes that signal strength is a factor of proximity, which is true in certain RF environments. However, the multipath phenomenon encountered in indoor RF environments, which include walls, windows, and other RF obstructions, does present certain difficulties for location systems using triangulation, since reflection and absorption of RF signals affects the correlation between signal strength and proximity. RF fingerprinting compares a mobile station's, or access point's, view of the RF environment (i.e., the strength of signals transmitted by the infrastructure access points, or the mobile station) with a database that contains an RF physical model of the coverage area.

With the development of integrated circuits (IC), both AM and FM radio circuits have been integrated into one chip. Conventional radio chips with a frequency scan function implement a frequency-lock-loop in a manner to achieve only a forward (i.e., band-up) electronic tuning function. Such a scan function drives the radio chip, starting at its presently tuned frequency, to a higher frequency by increasing the radio's intermediate frequency. The scan function stops at the next higher transmitting station frequency that is detected and received by the IC radio.

There are IC FM radios having the forward (band-up) scan function available in the marketplace. Known FM radio chips include the TDA7088T, manufactured by Philips Semiconductors (The Netherlands), and the SC1088, manufactured by Hangzhou Silan Microelectronics Joint-Stock Co., Ltd. (Taiwan). The SC1088 and TDA7088T are each bipolar technology integrated circuits used for mono-channel portable radios. Each circuit comprises a frequency-lock-loop (FLL) system having an intermediate frequency of about 70 KHz. Selectivity is obtained from an active RC filter. For both these IC FM radios, electrical tuning is realized by a uni-directional (band-up) tuning function. The scanning circuit fast tunes the receiver and results in a very small waiting time for the radio to find the next higher occupied frequency.

SUMMARY OF THE INVENTION

A method is used in managing security and wireless signal detection. Information is gathered about analog signal reception at a receiver. Based on the information, a result is produced for use in determining location information at the receiver. The result is used to affect a security decision.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION

Described below is a technique for use in managing security and wireless signal detection. In at least one implementation, the technique may be used to help provide, among other things, a radio frequency (RF) geo token.

For example, a passive RF receiver may be used to detect (e.g., scan for) radio signals across a broad spectrum. At least some implementations scan for shortwave/AM/FM radio signals. The signal strength, presence, station ID and frequency information may be used to generate a signature of the RF background information for a specific geo location. In at least some cases, the RF receiver may use a pattern of which stations are detectable, and their relative signal strength. For example, in one location a certain set of radio signals may be detectable, and some may be stronger than others, and this pattern may be used to help identify the location. Depending on the implementation, the RF receiver technology may be low power (e.g., as low power as crystal radio) and fairly broad spectrum.

Conventionally, hardware OTP tokens cannot detect the RF signals around them and do not provide this information, e.g., to a server for policy controls.

By contrast, at least one implementation based on the technique as described herein utilizes existing and/or special purpose RF transmitters to detect geo-location signals that can be used to approximate the device GEO location with lower cost and lower power requirements than traditional GPS systems. For example, in case of a failure of the GPS system, the RF geo location system may provide sufficient information for existing Geo location systems.

Figure 1:
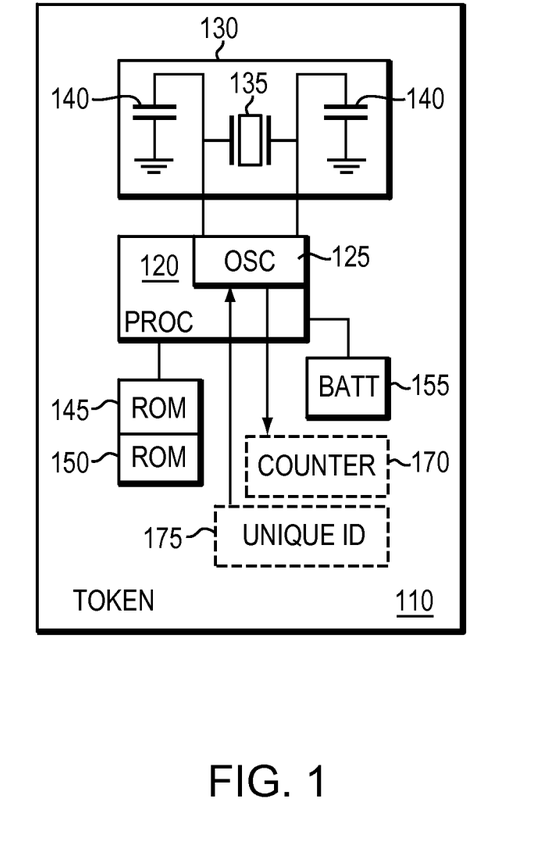
FIGS. 1-2 are block diagrams of examples of systems that may be used with a technique described herein.

FIG. 1 illustrates an authentication token 110 (also referred to as OTP generator) that is an example of a mechanism that may be used with the technique described herein. The token provides two-factor authentication where a user may be issued an individually-registered token, which generates single-use OTPs, which change based on a time code algorithm. For example, a different OTP may be generated every 60 seconds. The generation of the OTP may be driven by an internal clock of the OTP generator.

Token 110 includes a processor 120 having an oscillator section 125 driven by a crystal circuit 130 that includes a crystal 135 and capacitors 140. The processor has or is connected to read only memory (ROM) 145 containing firmware instructions for the processor, and has or is connected to read-write memory (RAM) 150. The processor is powered by a battery 155 (in other implementations, power may be supplied in addition or instead by another power source such as a USB port). Depending on the implementation as described below, the token may or may not have a counter 170 driven by the oscillator section, and/or a unique identification number such as processor's unique identifier 175. (In another example implementation, e.g., for an event-synchronous token, a simple RC (resistor-capacitor) driven oscillator may be adequate—and in some cases the oscillator is entirely internal to the microprocessor.)

The OTP, in isolation or in combination with a user Personal Identification Number (PIN), may be supplied to an OTP validation entity. In some applications, the OTP in combination with different PINs may provide variance for the information transmitted to the authentication entity. Herein for simplicity, the OTP in isolation or in combination with the user PIN may be referred to as the OTP. The OTP validation entity may be a server or other processing device which may determine if the supplied information is valid, and may grant access appropriate to his or her authorization level.

The OTP validation entity may also have an internal clock to index the supplied token by a given time T. That is, the validator may compare a passcode the token generated to a passcode the validator generates at time T. In doing so, the validator may assume that the time T of the OTP is the same as the time T of the validator. In at least some embodiments, the time T may be used as an input to the function to generate the OTP. In certain embodiments, if different times are used to generate OTPs, the resulting OTPs generated may be different. As used herein, an OTP generator, or token may be used interchangeably to refer to what generates a passcode.

An OTP generator may be a software program resident on a hardware device, a hardware device, or a combination of software and hardware. An OTP generator includes a set of inputs, such as a key, an identifier for the particular key, and a value that changes monotonically (e.g., time, or a counter value). Both the OTP generator and the OTP validation entity must have access to this information to enable the validation of OTP values. Typically, OTP generators are provisioned or passed a key, and the key in token products is often stored in a file on the host operating system or in memory on a hardware device. The information about characteristics of a token may be referred to herein as the token information file.

An OTP generator may need to be provisioned. Provisioning may be the process of initiating the token generation device with a time and a serial number or seed. In hardware, the provisioning process may be part of the manufacturing process. Typically, the key may be stored or available on the hardware and may be protected via some form of encryption.

Figure 2:
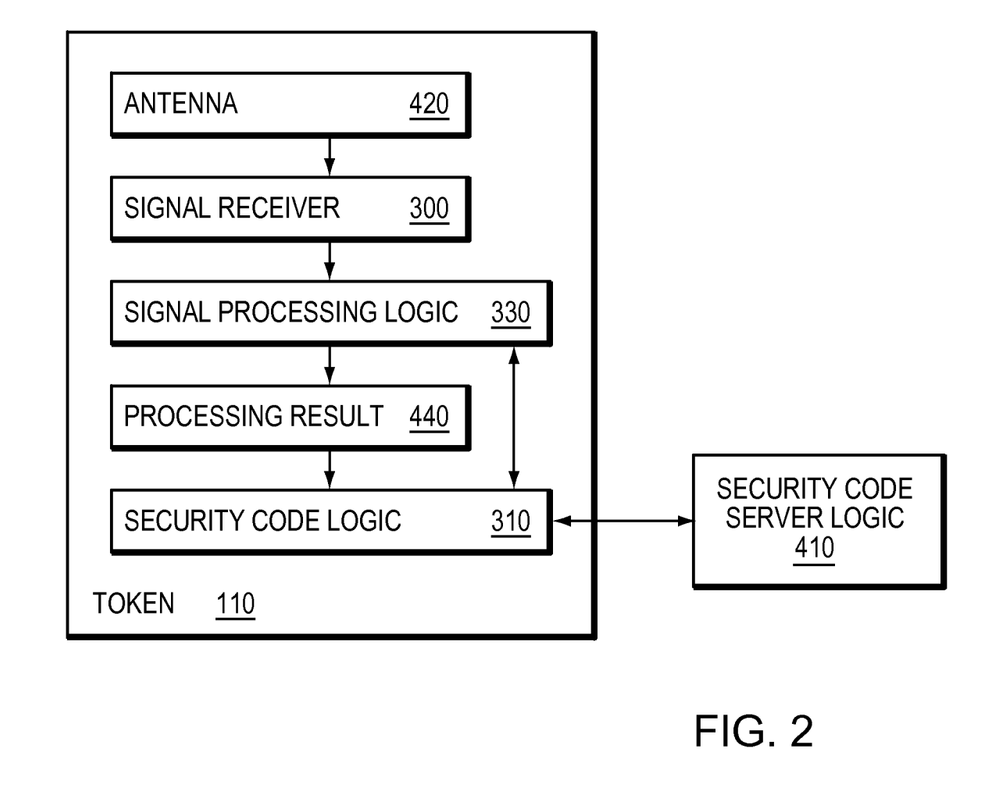

FIG. 2 illustrates additional aspects of token 110 in accordance with the technique described herein. Signal processing logic 330 derives a processing result 440 from a signal detected by signal receiver 300 using antenna 420. Security code logic 310 uses result 440 to affect the token's OTP generation.

Logic 330 and/or logic 440 may be implemented by processor 120 using ROM 145 and RAM 150, or may be implemented using separate processing or logic. Receiver 300 may be, include, or be included, for example, in an FM receiver, such as an IC FM radio.

Processing result may be, for example, an indication of a characterization of the FM signal signature in the token's current location, and logic 310 may use that result, for example, to help determine an OTP for the token to produce, or to help determine whether or when to produce the OTP.

Example implementations may have one or more of the following aspects.

Signal presence and/or absence may be used by logic 330 to create, and include within result 440, a table of strongest signals with their corresponding station identification call letters. Utilization of a fractal antenna as antenna 420 may reduce the need for a long antenna and allow the antenna to be included in a small device such as token 110.

Transmission of geo location data may be done by utilizing a data channel available in OTP tokens as described below, similar to that which is used in the case of tamper detection. (For example, result 440 and/or geo location data may be treated as and communicated as "event state information" as described in commonly owned U.S. Pat. No. 7,502,933 entitled "IDENTITY AUTHENTICATION SYSTEM AND METHOD".) Signal information from receiver 300 may be used by logic 330 to generate a simple small piece of data, e.g., 10 bits, to represent the geo location of the token. Depending on the implementation, logic 330 or logic 310 may also correlate the signal information with data stored on the token to determine whether it matches any pre-programmed locations.

The location information may be sent to the authentication server having security code server logic 410, and compared against earlier authentication RF signal information and the IP geo location indicated by a user's browser to determine whether the device is likely in the geo location it is reporting to be in.

Once the server has sufficient information about the token's RF geo location and IP geo location correlation, it may be able to detect whether the token has generated a geo location signal that does not match the IP geo location. Such a mismatch may be a strong indicator that the OTP token code information has been captured and is being replayed from another location.

If the ability to send more data is present, the token can transmit all available data, but when the token is disconnected and is simply displaying a short 4-10 digit code, all possible signals need to be consolidated into a smaller data space. Because the number of RF signals present in a geo location can vary depending on the physical environment of the token, e.g., (in a building's basement), or due to the possibility of signals being detected that would not normally be present due to reflection of the signal off of cloud cover, in at least some implementations it is important that the process of identifying a geo location is able to take this into account. For example, dividing the Earth into 1024 metro regions and having information about the likely RF signals in those geographies helps provide a means of such identification. For example, even if one or more signals are missing or extra signals are present, the process is able to determine the best fit to the known metro regions and send that 10 bit signal to the server.

Depending on the implementation, other signals may be used in addition to or instead of RF signals.

For example, the token may detect atomic clock signals that are currently sent to allow clock radios and clocks in general to synchronize their time for their time zone. Such signals may be used as known reliable transmissions and detected if they are being received, without a need to decode the time.

In another example, the token may rely on the fact that some radio stations transmit RDS signals, which are digital signals containing the identity and other data from the stations. This RDS data may be used by the token to generate a map of stations in the area, e.g., only for FM stations.

TV signals may be used similarly by the token since TV transmissions are essentially FM transmissions as well.

In at least some implementations the token may rely on the data channel noted above as an alternate data transmission approach. With respect to the data channel, OTP token codes may be generated as 6 digits. A small number of bits of the OTP code may be used to transmit additional data to the server. For example, the data may include:

Tamper indication
Battery life indication
Geo location
Deliberate seed drift

Depending on the implementation, the data channel is limited to just a few bits because it is not desirable to significantly weaken the strength of the authentication. In other implementations, a different approach may allow for much larger messages to be sent to the server, but requires that the message does not change often. Infrequently changing messages can be more complex as long as they do not change often. These types of messages may include:

Tamper indications
Batter depletion rate, or expected battery expiration date.
Geo location information Because the message is complex but infrequently changing, the full token code length (6 digits) is needed to transmit this data. At least one example uses a simple XOR operation on the OTP code with the message, wherein the token generates the expected OTP code and XORs that expected OTP code with the current data message that the token is to send. The result of the XOR is displayed to the user. On receipt of an authentication request the server may XOR the authentication value sent with the expected OTP and thereby recover the data message. If the data message is un-changed from the last authentication, the OTP is valid and the user is authenticated. If the data message is different from what the server was expecting, the server may attempt to validate the message to confirm that the message has actually changed and is not the result of an adversary attempting to guess an authentication code. To perform the confirmation the server asks the user to enter the next token code displayed, which may leverage an existing capability of the server to request a next token code from the user. When the server receives the next code, the server XORs the next code with the expected next OTP and recovers the data message. Because the message changes infrequently, if it is valid, it should match the message that was previously received. If it does match, the server authenticates that the user is in possession of the token and take actions on the validated long message it received. For geo location data the server may store multiple recent geo location messages and if the value sent to the server indicates a geo location that matches any of the recent geo location messages, logic 410 determines that the OTP is valid and the token is in a familiar location.

In another implementation, the token is pre-provisioned with a set of expected radio stations. In the simplest case, each radio station is assigned to a bit. For example, in the Boston area, WBZ may be assigned to bit zero, WHDH to bit one, KISS to bit two, and other radio stations may be assigned to other bits. When the token is operating, the token scans to detect radio stations, and for each of the pre-provisioned stations the token sets the corresponding assigned bit if the station is detected, and clears the corresponding assigned bit if the station is not detected, to produce a bit pattern. This bit pattern is then combined with the OTP in the token, e.g., using an XOR or add-no-carry operation, to produce an enhanced OTP. The user prepends the user's PIN as usual to the enhanced OTP, to produce a value that is supplied to the server. At the server end, the server then strips the PIN off the supplied value to recover the enhanced OTP and applies an expected bit pattern to the enhanced OTP to produce a recovered OTP. The expected bit pattern identifies a particular area or location where certain radio stations may be detected and certain other radio stations may not be detected. If the bit pattern used by the token to produce the enhanced OTP is the same as the expected bit pattern, the recovered OTP matches an expected OTP for the token. This process makes the token-based authentication system into a 3 factor system, based on something the user has (the OTP), somewhere the user is (indicated by the bit pattern), and something the user knows (the PIN).

Variations are possible. For example, some of the bits may be assigned to the user's work location, and others to the user's home location. Accordingly, the user's location can be identified or at least differentiated or distinguished, and if the user is expected to be at home, but is showing up as being at work, the risk score of the authentication may be increased.

In another example, confounder bits are used, which are bits that should never be set in a valid situation. A bit for WABC in New York should not show up as set in a token meant for valid use only in California, for example. These confounder bits make it more difficult for an attacker to spoof geo information if control over the seed is lost.

In other examples, the indication of the stations need not be simple bit positions—more complex encoding is possible if needed.

In a specific example implementation, a database may be built and used that has information about known RF signals in an area, and based on the database, a score of associated probability of location may be produced and used to affect a security decision. For example, even if not all of the expected stations are found or are at expected strength, it may be determined to a sufficient level of confidence based on the score that the token is in a valid location.

In at least one implementation, use of the complex message requires a message payload that can be delivered securely to the server of about 19 bits of data per authentication, which is a significant expansion in the complexity of the message that can be sent, e.g., from 16 possible messages with a 4 bit delivery method to 1 million different messages with the 19 bit delivery method. Depending on the implementation, this method may be restricted to messages that only change infrequently, because if the message changes frequently, the user may be prompted for the next token code too often and there is a chance that the message actually changes between one token code and the next.

In an example implementation, the method of encoding the information may be agile, and may change based on an event.

In a simple case, on even days one encoding may be used, and on odd days a different encoding may be used. Other, more complex ways of changing the encoding of the information are possible and are discussed in commonly owned U.S. patent application Ser. No. 12/895,130 entitled "AGILE OTP GENERATION", filed Sep. 30, 2010.

At least one implementation relates to an allowed use location feature. With a token that can detect an RF signal's presence it is possible to have a token that has restricted use. For example, the token may display valid token codes only when an expected or acceptable signal is present. Absence of such a signal may cause the token to display no code or to send an alternate token code which the server can use to determine that the token is being used in an unauthorized location. Such a feature allows creation of a facility where the tokens can be used at or in the facility, but not elsewhere, e.g., not from home. If the signal received can be processed into result 440, the token can detect not only the presence of the signal but also the transmission of a key that can change over time and needs to be validated by the token as authentic before valid token codes are displayed.

In another feature based on the technique, the token can detect whether the token has traveled to or is present in a restricted location. If the token can detect the RF signals of known fraud locations or restricted locations, logic 310 can use this detection to flip a bit in the token or otherwise cause the token thereafter to generate token codes that indicate the token was or is in a restricted area. The restricted area may be as small as a particular building or facility where the "restricted location" RF signals are present, or may include restricted metro regions where specific radio signals are known to exist.

In general, at least some implementations based on the technique may rely on detection and/or use of an RF spectral fingerprint, e.g., a predetermined combination of observable RF spectral parameters, and result 440 may be, include, or be included in such RF spectral fingerprint. For example, observed signal strength of a predetermined set of signals in the RF spectrum may constitute a fingerprint. For any given location, it may be possible to pre-select a portion of the spectrum and a combination of signal parameters in the pre-selected band that are unique or nearly unique to that location.

For example, receiver 300 and logic 330 may use signal characteristics from the television band, in which case receiver 300 and logic 330 may implement a tuner capable of detecting appropriate television channels. In another example, receiver 300 and logic 330 may implement a tuner that detects AM or FM radio broadcasts. In this case receiver 300 is capable of tuning to the appropriate radio broadcasting bands.

In some cases, authentication may rely on only determining whether token 110 is at a particular location or not. Depending on the implementation, the resolution of knowing the token's location is not high (e.g., several meters), but much coarser, such as of the order of several tens of meters. For example, authentication may be reliant on knowing whether the token is inside a particular building, or a campus or a block. In such cases it is not necessary to provide very high-resolution information.

Depending on the implementation, when a location estimate of the token is desired, it activates receiver 300 and logic 330, which capture predetermined information from a predetermined portion of the RF spectrum. Instructions regarding which information to capture and the portion of the RF spectrum from which to capture may be either pre-programmed in the token, or generated in real time. In the latter case, it may be generated in the token, or downloaded for use by the token.

The token may capture multiple pieces of information or from multiple portions of the spectrum.

The spectral fingerprint may be generated using many different parameters, either individually or in combination. In one embodiment, signal strength is used. In another embodiment, phase information is used. In another embodiment, the identity of the received signals (e.g., frequency) is used. In yet another embodiment the identity of the signal source (e.g., channel number or station code) is used. In yet another embodiment, the geographic locations of the transmitters from which the signals originate are used.

The token is equipped with the appropriate circuitry and software to capture the required signals and their parameters. In one embodiment antenna 420 has characteristics making it effective with a bandwidth spanning a large portion of the VHF and UHF spectrum, e.g., from 70 MHz to 1 GHz. In another embodiment, antenna 420 has characteristics making it effective with to help capture only a narrowband of the spectrum (such an antenna may be cheaper to implement and less obtrusive). In one embodiment receiver 300 is equipped with appropriate circuitry to determine the strength of the received signal. In one instance the location of the transmitter is broadcast in the signal and is extracted in receiver 300 and/or logic 330.

In one embodiment, logic 330 is instructed by logic 310 to scan selected portions of the spectrum and capture selected parameters from the received signals. Logic 310 determines which portions of the spectrum to scan and what parameters to capture based on other information it has received or generated regarding the token. For example, in one instance logic 310 knows the approximate location or expected location of the token, and logic 310 can determine which signals in the vicinity are most suitable for generating a fingerprint. For example, certain television signals may have better coverage of the area than other signals. Logic 310 then transmits this information (e.g., television channel numbers) to logic 330 requesting it to scan only those selected signals.

In another embodiment, the token determines which portion of the spectrum to scan, and which parameters to use for generating the fingerprint.

After the token captures the appropriate signals and extracts the parameters, it has the basic information for generating the fingerprint. Some preprocessing by logic 330 may be required to refine the raw data. For example, signal strengths may have to be lower and upper limited to eliminate very weak and very strong signals.

Once the fingerprint is generated, its association with a certain location is determined. In at least one implementation this is done by utilizing a fingerprint database that contains a number of fingerprints along with their corresponding location identities. In one embodiment the database is stored in the token. The generated fingerprint is compared with the fingerprints in the database and the fingerprint in the database that is closest to the generated fingerprint is selected as the match. The corresponding location in the database is then chosen as the location of the token. In one embodiment, the search method takes more than one fingerprint from the database that are closest to the generated fingerprint and interpolates the most plausible location for the token from the locations of the chosen fingerprints.

In another embodiment the fingerprint database is stored with server logic 410 and the generated fingerprint (in the token) or a summary or digest of such fingerprint is transmitted to logic 410 as described above. The search for the closest fingerprint is then done by logic 410 from which it determines the location of the token.

According to one implementation, the fingerprint database is designed to take into account any dynamic, but predetermined, variations in the RF signal characteristics. For example, it is not uncommon for a radio broadcast station to lower its transmitter power at night. If signal strength is one of the parameters used for generating the fingerprint, such lowering in transmitted power is taken into consideration before any decision is made. Therefore the fingerprint database and the decision methods are configured to accommodate such dynamic changes. Since the change pattern in signal characteristics is predetermined, the database may be constructed by capturing the fingerprints at different times so as to cover all the different patterns in the transmitted signals. The time at which a fingerprint was captured may also be stored along with its location identity.

Figure 3:
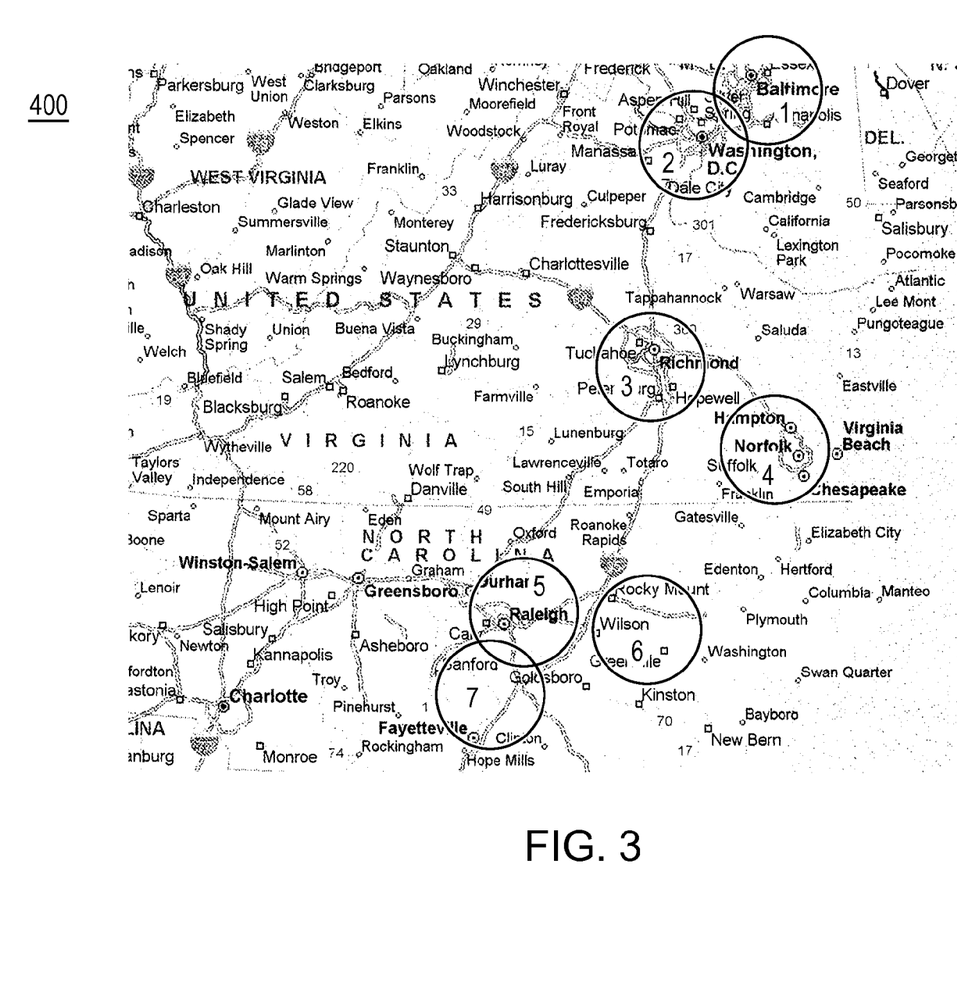
FIG. 3 is an illustration of examples of geographic aspects of signals that may be used with a technique described herein.

FIG. 3 illustrates a radio station coverage map 400 that helps to illustrate use of an implementation based on the technique. Circles 1-7 illustrate coverage areas of seven respective radio stations. The radio stations can be represented on a map based on predetermined transmitter location and transmitter coverage area information for the radio stations. Map 400 represents seven radio stations as circular transmitter coverage areas superimposed on the map. In FIG. 3, the circular transmitter coverage areas are centered on the transmitter locations for the radio stations, and the sizes of the circular transmitter coverage areas correspond to the predetermined transmitter coverage areas for the radio stations, and can be GUIs, as explained above. In a first example case, token 110 may be configured so that an OTP code is produced only if token 110 can detect a signal or signature corresponding to coverage area 3. In a second example case, token 110 may be configured so that no OTP is produced if token 110 detects a signal or signature corresponding to coverage area 4. In a third example case, logic 410 may be configured so that no OTP is authenticated if token 110 communicates to logic 410 that token 110 detects a signal or signature corresponding to coverage area 6. In a fourth example case, logic 410 may be configured so that an OTP is authenticated only if token 110 communicates to logic 410 that token 110 detects one or more signals or signatures corresponding to the overlap of coverage area 1 and coverage area 2.

In further embodiments, the OTP generator may access or include other local or environmental variables to generate the OTP. In some embodiments, the environmental variables may include a cell tower, other wireless devices, or other indication of geographic location. In other embodiments, the environmental variable may be a network identifier or other identifier. In some embodiments, a Beacon or other marker in a Virtual Machine may be included as an input in the OTP generator. In other embodiments, a specific range may be included in the OTP generation. In certain embodiments, additional inputs may be included in the OTP generation provided that these inputs be conveyed, calculated, or known a priori by the OTP validator.

One or more tokens, OTP validators, and validators may be included in, or include, by way of example and without limitation, a computer, a mobile telephone, a personal digital assistant (PDA), a smart card, an authentication token, a server, and/or various portions or combinations of these and other processing devices. One or more of tokens and validators may thus be implemented as otherwise conventional processing devices programmed by software and/or firmware to perform portions of the technique as described herein. Conventional aspects of such equipment are well known to those skilled in the art, and are therefore not described in detail herein.

In an example implementation, the token comprises or is otherwise associated with an authentication token, such as an RSA SecurID® authentication token. However, the technique is adaptable in a straightforward manner to a wide variety of other cryptographic processing devices.

A token may communicate with a validator directly over respective links, or may communicate via one or more intermediary processing devices. For example, if the token comprises an authentication token, it may communicate with a validator over an internet link or using an intermediary device such a desktop or portable personal computer, mobile telephone or PDA to allow user entry of the OTP. A token may be viewed as comprising, for example, a combination of an authentication token and an associated computer or other intermediary device physical or virtual. As indicated above, the term "processing device" as used herein is intended to encompass such combinations of devices.

Details regarding certain conventional cryptographic techniques suitable for use in conjunction with the present invention may be found in, e.g., A. J. Menezes et al., Handbook of Applied Cryptography, CRC Press, 1997, which is incorporated by reference herein.

It should again be emphasized that the embodiments described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

The logic for carrying out the method may be embodied as part of the aforementioned system, which is useful for carrying out a method described above. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A method for use in managing security and wireless signal detection, the method comprising:
    defining at least one expected station;
    gathering information about analog signal reception at a receiver, wherein the gathered information identifies a station;
    determining whether the station as identified by the gathered information corresponds to the at least one expected station;
    based on the said determination, producing a result for use in determining location information at the receiver; and
    using the result to affect a security decision, wherein the security decision relates to the generation of a passcode.

2. The method of claim 1, wherein the gathered information is signaled to a server and the server derives the security decision based on a policy and the gathered information.

3. The method of claim 1, wherein a token comprises the receiver, the token is pre-provisioned with data about expected analog signals and with a policy, and the token derives the security decision based on the gathered information, the pre-provisioned data, and the policy.

4. The method of claim 1, wherein a token is pre-provisioned with data about expected analog signals and with a policy, and the token bases generation of a token code on an analysis of the gathered information and the data about expected analog signals.

5. The method of claim 1, wherein the security decision is based on a one time password, the location information, and a Personal Identification Number (PIN).

6. The method of claim 1, wherein the result comprises a bit pattern describing stations detected by the receiver.

7. The method of claim 1, wherein the result comprises a score of associated probability of location.

8. The method of claim 1, wherein a token comprises the receiver and a signal based on the gathered information is transmitted in encoded form from the token to a server.

9. The method of claim 1, wherein a token comprises the receiver and has an allowed use location feature wherein the token has restricted use based on when the gathered information indicates that an acceptable signal is present.

10. The method of claim 1, wherein a token comprises the receiver and when the token detects, based on the gathered information, that the token is present in a restricted location, the token indicates such detection.

11. A system for use in managing security and wireless signal detection, the system comprising:
    a processor and memory;
    the system configured to:
    define at least one expected station;
    gather information about analog signal reception at a receiver, wherein the gathered information identifies a station;
    determine whether the station as identified by the gathered information corresponds to the at least one expected station;
    produce, based on the said determination, a result for use in determining location information at the receiver; and
    use the result to affect a security decision, wherein the security decision relates to the generation of a passcode.

12. The system of claim 11, wherein the gathered information is signaled to a server and the server derives the security decision based on a policy and the gathered information.

13. The system of claim 11, wherein a token comprises the receiver, the token is pre-provisioned with data about expected analog signals and with a policy, and the token derives the security decision based on the gathered information, the pre-provisioned data, and the policy.

14. The system of claim 11, wherein a token is pre-provisioned with data about expected analog signals and with a policy, and the token bases generation of a token code on an analysis of the gathered information and the data about expected analog signals.

15. The system of claim 11, wherein the security decision is based on a one time password, the location information, and a Personal Identification Number (PIN).

16. The system of claim 11, wherein the result comprises a bit pattern describing stations detected by the receiver.

17. The system of claim 11, wherein the result comprises a score of associated probability of location.

18. The system of claim 11, wherein a token comprises the receiver and a signal based on the gathered information is transmitted in encoded form from the token to a server.

19. The system of claim 11, wherein a token comprises the receiver and has an allowed use location feature wherein the token has restricted use based on when the gathered information indicates that an acceptable signal is present.

20. The system of claim 11, wherein a token comprises the receiver and when the token detects, based on the gathered information, that the token is present in a restricted location, the token indicates such detection.

\* \* \* \* \*